Oct. 27, 1942.  A. C. PURPURA  2,300,061
WAFFLE BAKER
Filed Dec. 2, 1940  2 Sheets-Sheet 2
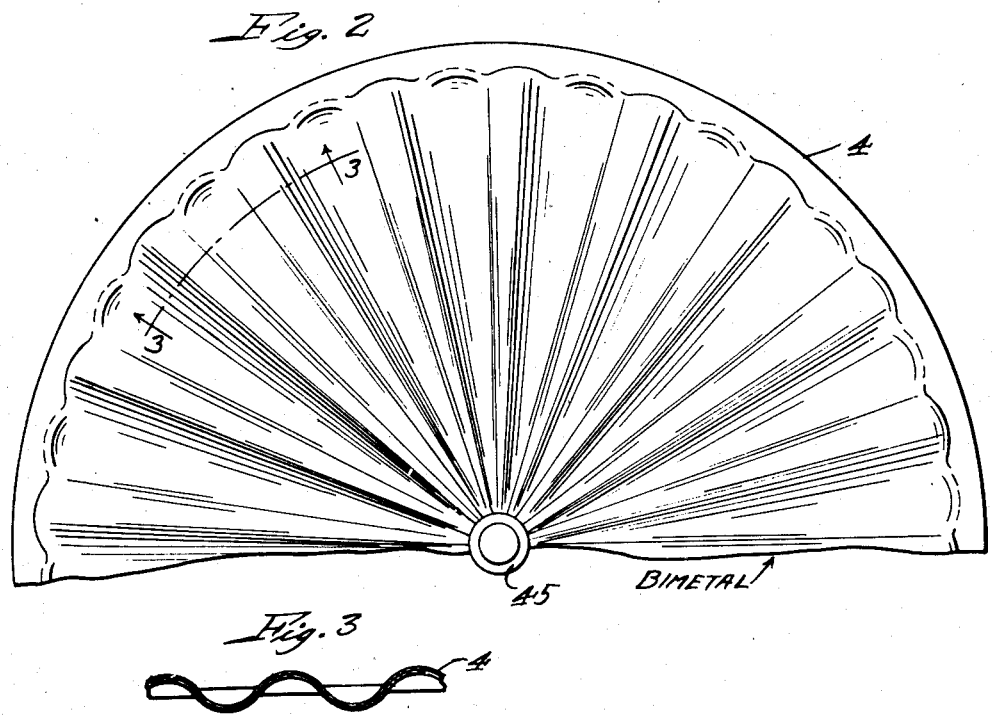

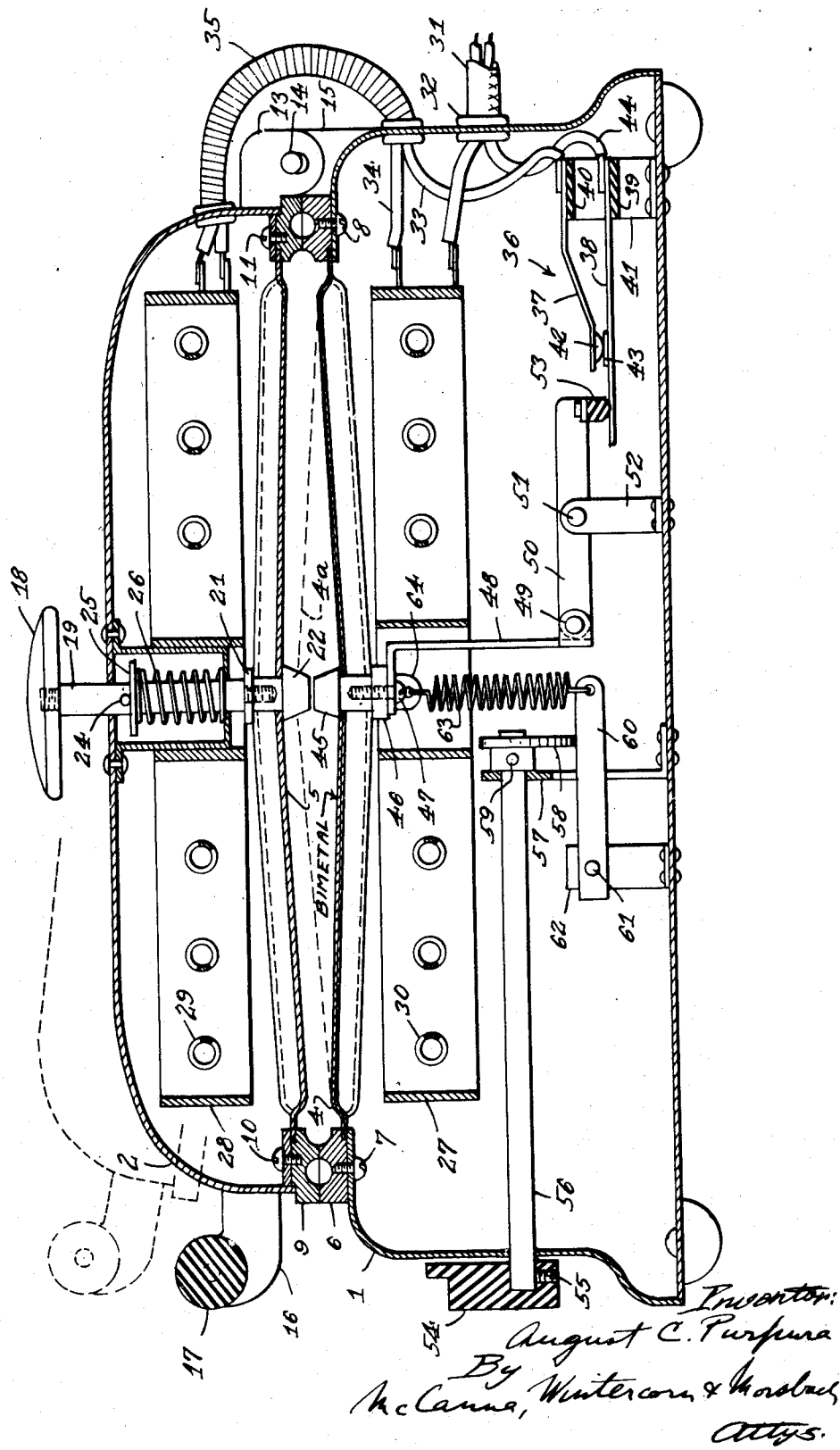

Patented Oct. 27, 1942

2,300,061

UNITED STATES PATENT OFFICE 2,300,061

WAFFLE BAKER

August C. Purpura, Chicago, Ill.

Application December 2, 1940, Serial No. 368,158

17 Claims. (Cl. 219—19)

This invention relates in general to thermally controlled cooking devices and has more particular reference to a new and improved waffle baker of the type wherein the baking operation is automatically terminated at a predetermined time.

One of the objects of my invention is to provide a waffle baker of the character described which will operate with unerring efficiency.

Another object of my invention is to provide a waffle baker having a snap-acting mould member for baking the batter adapted to snap in one direction at the termination of the baking operation and in the opposite direction when cooled, in successive cooking operations.

Another object of the invention is to provide a waffle baker having a flexible heat responsive mould and heating means therefor controlled entirely by the close association of the mould with the waffle batter temperature and operating to terminate the heating of the waffle when it has reached a predetermined temperature.

Another object is to provide a waffle baker having a snap-acting mould or grid member which eliminates the usual sticking of the waffle to the mould by reason of the sudden snapping action which tends to loosen the waffle from the mould or grid at the completion of the cooking operation.

Another object of my invention is to provide a waffle baker having a snap-acting cooking mould responsive to the cooking temperature to indicate or control the extent of the cooking operation.

A further object is to provide a waffle baker having a flexible heat responsive mould member and a flexible manually operated mould member constructed and arranged so that the heat responsive mould member automatically terminates the waffle baking operation and the other mould member may be manually flexed to remove the waffle from the mould without the use of a fork or other cooking instrument.

My invention also aims to provide an automatic waffle baker of the character described having adjustable means whereby any type of waffle may be made, either light or dark or any intermediate degree of brownness.

My invention also aims to provide a novel thermal timer particularly adapted for application to waffle baking.

My invention also aims to provide a novel method of making waffles.

Other objects and advantages will be apparent as the invention becomes better understood when considered in connection with the accompanying description and drawings which disclose a preferred embodiment.

Referring to the drawings:

Fig. 1 is a vertical section through a waffle baker embodying my invention;

Fig. 2 is a partial top view of one of the mould members;

Fig. 3 is a fragmentary section taken substantially on the line 3—3 of Fig. 2;

Fig. 4 is a side view of modified form of mould member embodying my invention; and Fig. 5 is a side view of still another form of mould member embodying my invention.

For purpose of illustration I have shown my invention as applied to an electric waffle baker although, as indicated above, it is in some respects adapted to other cooking devices. My invention contemplates mould or grid members 4 and 5 of novel construction and functional characteristics, as will be presently more fully described. I have here shown the mould members applied in a waffle maker having a suitable base 1 and cover 2. Each mould is preferably of thin flexible metal shaped and mounted so as to be capable of snap action. In the present embodiment the mould 4 is bimetallic and has a snap action in response to certain temperature changes and the mould 5 is non-bimetallic. The lower mould 4 is suitably mounted on the base 1, a circular flange 6 which is secured to the base 1 with the screws 7 and 8 serving to hold the mould in position. The upper mould 5 is suitably mounted on the cover member 2, a circular flange 9 which is secured to the cover member by the screws 10 and 11 serving to hold this mould in position. The cover 2 is pivotally connected to the base 1 by the hinge 13 and pin 14 and hinge bracket 15. A suitable handle is also provided for manually lifting the cover and is shown at 17 and is fastened to the cover by the brackets 16.

Each mould preferably consists of a marginal portion providing a mounting and an interior portion adapted to flex in a snap action. In the form shown in Figs. 1, 2 and 3, each mould member has a corrugated section formed by reverse curves to give alternating channels and ribs radiating from the center. This provides a unique mould face for wafflemaking and gives a stiff section which aids in the snap action. The waffle batter is poured onto the lower mould in the same manner as in a conventional waffle baker and the moulds are heated by suitable electric heating elements. Both moulds may be chrome-plated to make them better wear-resistant and to give a good cooking surface which will not discolor from the heat. Both are formed to suitable shape. Where the radiating channels and ribs are used I provide an open center in each mould to permit simple fabrication and forming. It will be readily seen that one of the advantages of having the mould members constructed as herein described is that the moulds are very easily cleaned by brushing between the ribs, something that is very difficult with conventional waffle moulds. The upper mould 5 which is made of a non-bimetallic material, preferably stainless steel, is manually operated for loosening the waffle from the upper mould by depressing the Bakelite handle 18 which is normally urged upwardly by a spring 26 pressing against a washer 25 and pin 24 on the rod 19. The lower threaded portion of the rod 19 is screwed into a stud 22 mounted in the center of the upper mould and a washer 21 mounted between the rod 19 and the stud 22 holds the stud in position on the mould.

The heating elements 27 and 28 are shown only in diagrammatic form and comprise coiled resistance wires 29 and 30 mounted on suitable brackets with conventional insulation such as mica washers and refractory hooks or knobs (not shown). Electric current may be supplied to the heating elements in any suitable manner. As shown, the current flows from the line circuit through a cord 31 which enters the base 1 through an insulated bushing 32. The heating elements 27 and 28 are connected in series by the wires 33 and 34 running through a flexible tubing 35 which is fastened at its ends to the body 1 and cover 2. The current flow to the heating elements is controlled by a suitable switch structure 36 which is shown as consisting of two spring type blades 37 and 38 mounted on blocks of insulating material 39 and 40 which are fastened to a bracket 41. Mounted on the ends of the blades 37 and 38 are suitable contacts 42 and 43, respectively. The current flows from a wire 44 from the cord 31 through blade 38 across the contacts 43 and 42, through blade 37 to the wire 33 and to the heating elements as shown by the wiring in Fig. 1.

The lower mould member 4 is a thermostat member preferably bimetallic and shaped so that its center portion is normally dished downwardly. When this mould is subjected to heat from the heating element 27 and after a predetermined temperature has been reached the center portion of the mould member snaps upwardly beyond a dead center position, as indicated by the dotted line 4a in Fig. 1. This lifts the waffle at its center portion and, in the present embodiment it also slightly raises the cover 2 on its hinge. This raising movement of the mould also actuates the switch blade 38 to discontinue the flow of current to the elements 27 and 28. This may be accomplished by suitable means, as follows: A stud 45 fastened to the center of the lower mould by a washer 46 and screw 47 transmits the motion. A bracket 48 secured to the stud 45 by the screw 47 is pivotally connected by a pin 49 to a lever 50 which is pivoted by pin 51 on bracket 52. A contact knob 53 of a refractory material is mounted on one end of lever 50 for actuating the switch blade 38 to separate the contacts 42 and 43 and thus break the circuit to the heating elements 27 and 28.

To vary the degree of cooking the mould member 4 is placed under spring tension by a knob 54 which is secured to a rod 56 by the set screw 55. The rod 56 is suitably mounted on the body 1 and on a supporting bracket 57. A cam 58 secured to the rod 56 by a pin 59 engages a lever 60 which is pivoted by pin 61 on bracket 62. A spring 63 connects the lever 60 to the stud 45 at 64. Thus, turning the knob 54 in a clockwise direction (facing the left hand side of Fig. 1), turns the cam 58, moves the lever 60 downwardly, stresses the spring and places the mould member 4 under greater tension. This obviously increases the cooking interval and produces a darker waffle. Turning the knob 54 in a counter-clockwise direction produces an opposite effect, a lighter waffle. The total travel of the knob 54 is, in the present embodiment, about 180°, and the front portion of body 1 may be graduated (not shown) and the words Light and Dark applied on the body 1 to indicate with the above described cycle.

Fig. 4 shows another form of my invention wherein the mould or grid has bosses 67 somewhat similar to conventional waffle moulds. The waffle batter in this structure does not contact the thermostatic metal directly because a metallic disc 65 is secured to a smaller bi-metallic disc 66 by rivet studs 68. The snap action is very accurately controlled because of the close association of the disc 65 and the thermostatic disc 66. The center portion of this mould member snaps upwardly in response to a predetermined cooking temperature like the mould member 4, to the dotted line position 4a shown in Fig. 1. The mechanical assembly may also be the same as the mould member 4.

Fig. 5 shows still another form of my invention in which the design is similar to Fig. 4 with the exception that the numerous rivet studs 69 are directly fastened to a thermostatic disc 70 and the waffle comes in direct contact with the thermostatic disc. This makes for very accurate operation in accordance with the waffle temperature and also serves to give rapid cooling effect on the disc when pouring the batter at the beginning of the cooking operation. The center portion of the mould member snaps upwardly for the same purpose as described with reference to Fig. 1. The mechanical assembly and control is also similar to that of the mould member 4 in Fig. 1. It is also to be understood that both mould members shown in Fig. 4 and Fig. 5 will be downwardly inclined at the center portion when assembled as shown in Fig. 1. This is caused by the downward pull of the spring 63 which exerts a tension on the mould holding it flexed in order to obtain a snap action.

The upper mould will be constructed, when using either lower mould shown in Figs. 4 or 5, similar to the mould shown in Fig. 5 with the exception that the disc 70 will be made of a non-thermostatic metal, preferably from stainless steel. The mechanical assembly and control will be similar to the upper mould 5 shown in Fig. 1.

The operation of the herein described invention is as follows: The operator must first preheat the mould members the same as with conventional waffle bakers now on the market. This is done in the present case by merely plugging the cord into an outlet connection, whereupon the current will flow through the switch and then to the upper and lower heating elements associated with their respective mould members. When the temperature of the moulds, which is controlled by the lower mould member, has risen to a predetermined degree the lower mould member being made of a thermostatic bimetal snaps upwardly, as shown in dotted lines in Fig. 1. This snap action movement of the lower mould member simultaneously breaks the circuit, interrupts the flow of current to the heating elements, and raises the cover to indicate to the operator the termination of the preheating period. The operator then lifts the cover higher and pours batter on the lower mould member. The lower mould member is then cooled very quickly by the batter and snaps downwardly, this snap action movement automatically turning on the switch to permit the flow of current to the heating elements. The operator then lowers the cover and the cooking operation starts. By turning the knob 54 the operator can adjust the length of the cooking operation to produce the type of waffle desired. When the waffle is baked to the extent controlled by the temperature of the lower waffle mould member, in this case for a period until approximately 425° F. is reached for a dark brown waffle and approximately 375° F. for a light brown waffle, the center portion of the lower mould member will automatically snap upwardly, lifting the center portion of the waffle and also the cover, as shown in dotted lines in Fig. 1. This simultaneously opens the switch contacts in the heating circuit and terminates the cooking operation. The operator then lifts the cover upwardly and it will be found that the waffle will cling to the upper mould member because the snap action of the lower mould member loosens the waffle from such member. However, the operator then merely strikes downwardly on the knob 18 on the cover thereby loosening the waffle from the upper mould member and permitting it to drop by gravity, whereupon it may be very easily removed by the operator.

It is thought that the invention and its attendant advantages will be understood from the foregoing description and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. A waffle baker having a disc-shaped bimetallic waffle mould adapted in response to heating to have a snap action movement from a baking position to a finished position, and means for heating said mould in a cooking operation to effect said snap action movement.

2. A waffle baker having heating means and a bimetallic thermally responsive waffle baking mould adapted to flex in a snap action movement in response to heat from said heating means.

3. A waffle baker having heating means, a waffle baking mould flexible in snap action movements to and from a baking position, and a bimetallic thermally responsive member coacting with the mould in response to heat from said heating means to cause said snap action movement of the mould away from said baking position.

4. A thermal timer having a bimetallic thermally responsive cooking mould adapted to flex from a cooking position to a non-cooking position in response to heat transmitted to the mould in the cooking operation.

5. A bimetallic thermally responsive cooking mould adapted to flex from a cooking position to a non-cooking position in response to heat transmitted to the mould in the cooking operation and adapted by said flexing to loosen the cooked article from the mould.

6. In a waffle baker or the like, a flexible bimetallic batter cooking mould member arranged with its high expansion metal on the upper side to snap upwardly when said mould member has reached a predetermined high temperature and to snap downwardly when said mould member has been cooled by the batter of a successive cooking operation.

7. In a cooking appliance, the combination of a flexible bimetallic warp-acting food cooking and supporting member adapted to warp in one direction when said cooking member has reached a predetermined high temperature and thereby lift the cooked article to indicate to the operator the termination of the cooking operation, and means operated by said warp-acting member to discontinue the heating operation in response to completion of the cooking operation.

8. In a waffle baker or the like, the combination of a thin bimetallic flexible batter cooking mould member adapted to flex in one direction in a snap action manner when said mould member has been subjected to heat, means for terminating the heating operation when said mould member has reached a predetermined high temperature, and means for continuing the heating of the mould member when said member has been cooled by a batter of the successive cooking operation.

9. In a waffle baker or the like, a thin bimetallic flexible batter cooking mould member adapted to flex upwardly in a snap action manner when said mould member has reached a predetermined high temperature to thereby lift the waffle to indicate the termination of the cooking operation.

10. In a waffle baker or the like, a heat responsive bimetallic snap-acting batter cooking and supporting mould member adapted to snap upwardly when subjected to heat, to lift the waffle upwardly and to terminate the heating operation.

11. In a waffle baker or the like, the combination of heating means, and a single flexible bimetallic batter cooking mould member adapted to flex in one direction when said mould member has reached a predetermined high temperature to thereby lift the finished waffle and simultaneously terminate the heating of the mould member and adapted to flex in opposite direction when said mould member has been cooled by the batter of a successive cooking operation and to continue the heating of the mould member.

12. In a waffle baker or the like, the combination of a flexible bimetallic lower mould member and a hinged upper mould member, heating means for both upper and lower mould members, a switch for controlling the current to said heating means, and means whereby after said waffle has reached a predetermined temperature said bimetallic lower mould member will snap upwardly thereby simultaneously lifting the finished waffle and the upper mould member on its hinge and actuating the switch member for terminating the heating of the mould members.

13. In a waffle baker or the like, the combination of thin flexible metallic upper and lower mould members each adapted for snap action, means including a bimetallic member coacting with the lower mould member for automatically snapping said member upwardly upon completion of the cooking operation, manual means for snapping the upper mould downwardly when removing the waffle, heating means for the mould members, a switch for controlling the flow of current to the heating means, and additional means controlled by the lower mould member for actuating the switch for terminating the heating of the mould members when the lower member snaps upwardly at termination of the cooking operation.

14. In a waffle baker or the like, the combination of a thin flexible batter cooking mould member adapted to flex upwardly in a snap-acting manner when said mould member has been subjected to heat, means for heating said mould member, means for terminating the heating operation when said mould has reached a predetermined high temperature, a spring connected to the center portion of the flexible mould member, and adjustable means for stressing said spring for determining at what temperature said snap action of the mould member occurs.

15. A cooking appliance having a bimetallic member on which an article is adapted to be cooked, means for heating said member to perform the cooking operation, and means for controlling the heating means in which the flexing of the bimetallic member is utilized to control termination of the cooking period and as a visible indication of such termination.

16. In a cooking appliance, a bimetallic member on which an article is adapted to be cooked, means for heating said member to perform the cooking operation, and means responsive to thermal flexing of the bimetallic cooking member to terminate the cooking operation.

17. In a cooking appliance, a member on which an article is adapted to be cooked, said member being flexible in a direction transversely of the major axis of the article, means for heating said member to perform the cooking operation, and a bimetallic member connected to said cooking member and serving to impart said transverse flexure to said cooking member in response to heat from said cooking operation, said flexure of the cooking member serving to displace the cooked article from its initial cooking position.

AUGUST C. PURPURA.